(12) United States Patent
Markham

(10) Patent No.: US 8,523,233 B2
(45) Date of Patent: Sep. 3, 2013

(54) LIQUID STORAGE TANK TRAILER

(75) Inventor: Gary R. Markham, Beaumont, TX (US)

(73) Assignee: The Modern Group, Ltd., Beaumont, TX (US)

( * ) Notice: Subject to any disclaimer, the term of this patent is extended or adjusted under 35 U.S.C. 154(b) by 0 days.

(21) Appl. No.: 13/281,434

(22) Filed: Oct. 26, 2011

(65) Prior Publication Data

US 2013/0106088 A1    May 2, 2013

(51) Int. Cl.
  *B60P 3/22*    (2006.01)
(52) U.S. Cl.
  USPC .......................................................... 280/839
(58) Field of Classification Search
  USPC ................................................ 280/837, 839
  See application file for complete search history.

(56) References Cited

U.S. PATENT DOCUMENTS

| | | | |
|---|---|---|---|
| 4,874,184 A | 10/1989 | Boyer | |
| 5,004,269 A | 4/1991 | Pelt | |
| 5,213,367 A * | 5/1993 | Norman et al. | 280/837 |
| 5,653,469 A * | 8/1997 | Wade | 280/837 |
| 5,671,855 A * | 9/1997 | Norman et al. | 220/1.5 |
| 6,152,492 A | 11/2000 | Markham et al. | |
| 6,279,955 B1 * | 8/2001 | Fisher | 280/837 |
| 2009/0273174 A1 * | 11/2009 | Markham | 280/837 |

\* cited by examiner

*Primary Examiner* — Tony Winner
(74) *Attorney, Agent, or Firm* — Fulbright & Jaworski LLP

(57) ABSTRACT

An improved mobile fluid storage tank having a base, substantially vertical front wall, a substantially rear wall, a pair of substantially parallel side walls and a roof structure. The roof structure has a rear roof portion and a front roof portion. The rear roof portion is substantially parallel with the base and extends along the rear portion of the two side walls while the front roof portion is comprised of a single sloping section which extends from the forward end rear roof portion to the vertical front wall. The intersection of the front and rear roof portions being selected to provide the optimum volume of fluid content of the tank.

13 Claims, 4 Drawing Sheets

LIQUID STORAGE TANK TRAILER

TECHNICAL FIELD

The present invention relates to a mobile liquid storage tank trailer. More particularly, the present invention relates to an improved mobile storage trailer with enhanced characteristics permitting it to accommodate an increased volume of fluid.

BACKGROUND OF THE INVENTION

There are a number of different types of liquid storage tank trailers which can be towed from one location to another. Examples of such include are shown in U.S. Pat. Nos. 6,152,492; 5,004,269; and 4,874,184. These fluid storage tank trailers are generally trapezoidal-shaped or stepped from the forward end to the rearward end to enable it to be supported at the rear end by an axle and wheels/tires when the fluid tank has its front end lifted and is secured behind a towing tractor vehicle.

The shape of the storage tank is influenced by maximum, non-permitted road height limitations when the tongue of the trailer is attached to the fifth wheel of a towing tractor. In the United States the front end of such a trailer once attached to a tractor is usually limited to between about 13.5 feet and 14 feet, without permitting. Therefore, the front end is necessarily designed about 48 to 50 inches shorter so that once installed on the fifth wheel of a tractor, it falls below the maximum non-permitted road height limitation.

The problem with existing trailer designs is the general limitation associated with the amount of volume that any given trailer can accommodate in view of non-permitted road height and width limitations. These trailers are typically used to store hydraulic fracturing fluid which is used in the fracturing of an oil or gas formation. As such, the existing designs typically accommodate maximum volumes of approximately 500 barrels. Such trailers are transported empty to the location and are not filled until they are on location. Thus, a weight limitation associated with a fully-loaded trailer is not a factor.

More recently, due to enhanced fracturing technology, larger volumes of fracturing fluid are required. In order to minimize the number of trailers required on location to hold the fluid, the need exists for larger capacity trailers. Unfortunately, the prior art is unable to accommodate larger volumes in view of non-permitted road width and height limitations.

Thus, the need exists for an design which can accommodate more volume yet satisfy the limitations associated with non-permitted road width and height limitations.

BRIEF SUMMARY OF THE INVENTION

The present invention is an improved mobile fluid storage tank trailer. This improved mobile fluid storage tank has a base with a front and rear end. At the front end of the base is a substantially vertical front wall and at the rear end of the base is a substantially vertical rear wall. A pair of substantially parallel vertical side walls are attached to the base and to the front and rear walls. There is a rear end roof portion extending across the rearward portion of the side walls defining a rear storage chamber and a front end roof portion extending across the forward portion defining a front storage chamber. The front and rear storage chambers are in fluid communication. The base is designed to rest on the ground once disconnected from the tractor. In this manner, the heavy load associated with stored fluid passes through the structure to the ground. The rear end roof portion is generally rectangular in shape and generally parallel with the base. The front end roof portion is a sloped section which extends from a high end at the rear end roof portion to a lower end at the front wall. The intersection of the rear and front end roof portions is selected such that the length of the rear end roof portion is preferably between about 35% and 60% of the length of the vertical side walls of the tank trailer, more preferably between about 40% and 55% of the length of the side walls, and most preferably between about 42% and 50% of the length of the side walls. In this manner, a maximum volume of fluid can be accommodated in view of the non-permitted road width and height limitations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

A better understanding of the invention can be obtained when the detailed description of exemplary embodiments as set forth above is reviewed in conjunction with the accompanying drawings, in which:

FIG. 2A is a partial cross-sectional view taken along line 2A-2A of FIG. 2 of the subject invention;

DETAILED DESCRIPTION OF THE INVENTION

Figure 1:
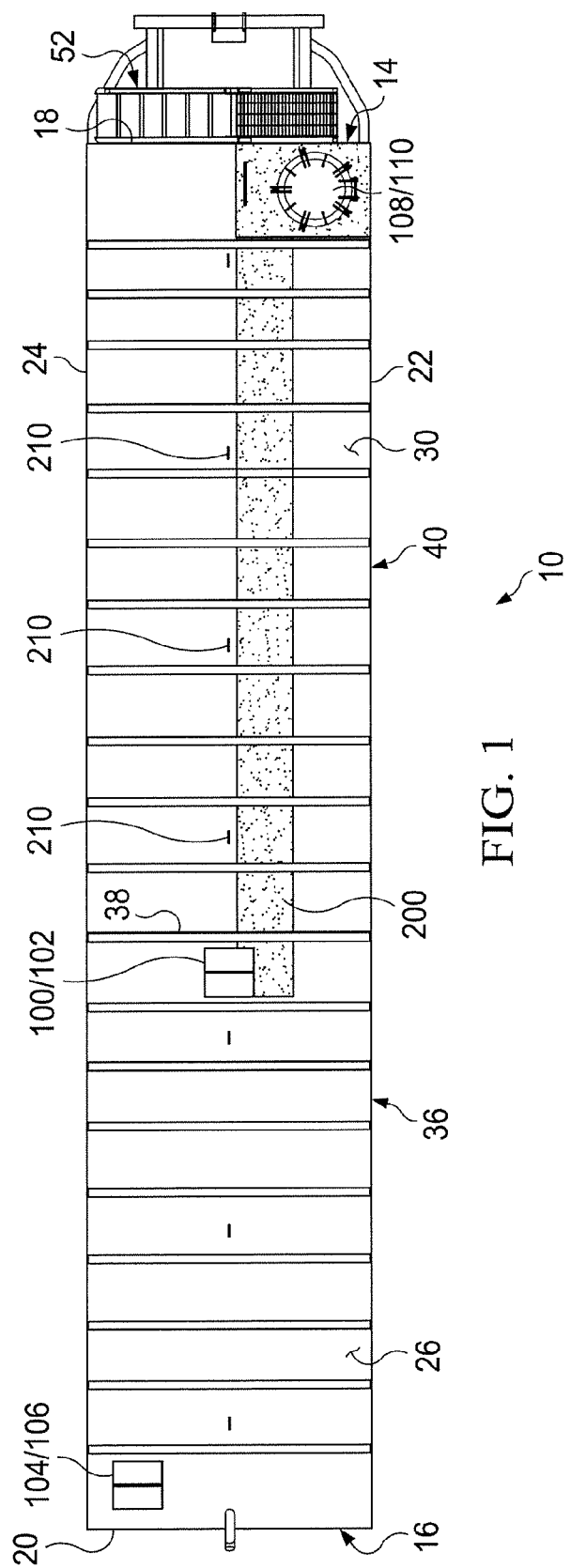
FIG. 1 is a plan view of the top of a mobile fluid storage tank of the subject invention.
Figure 2:
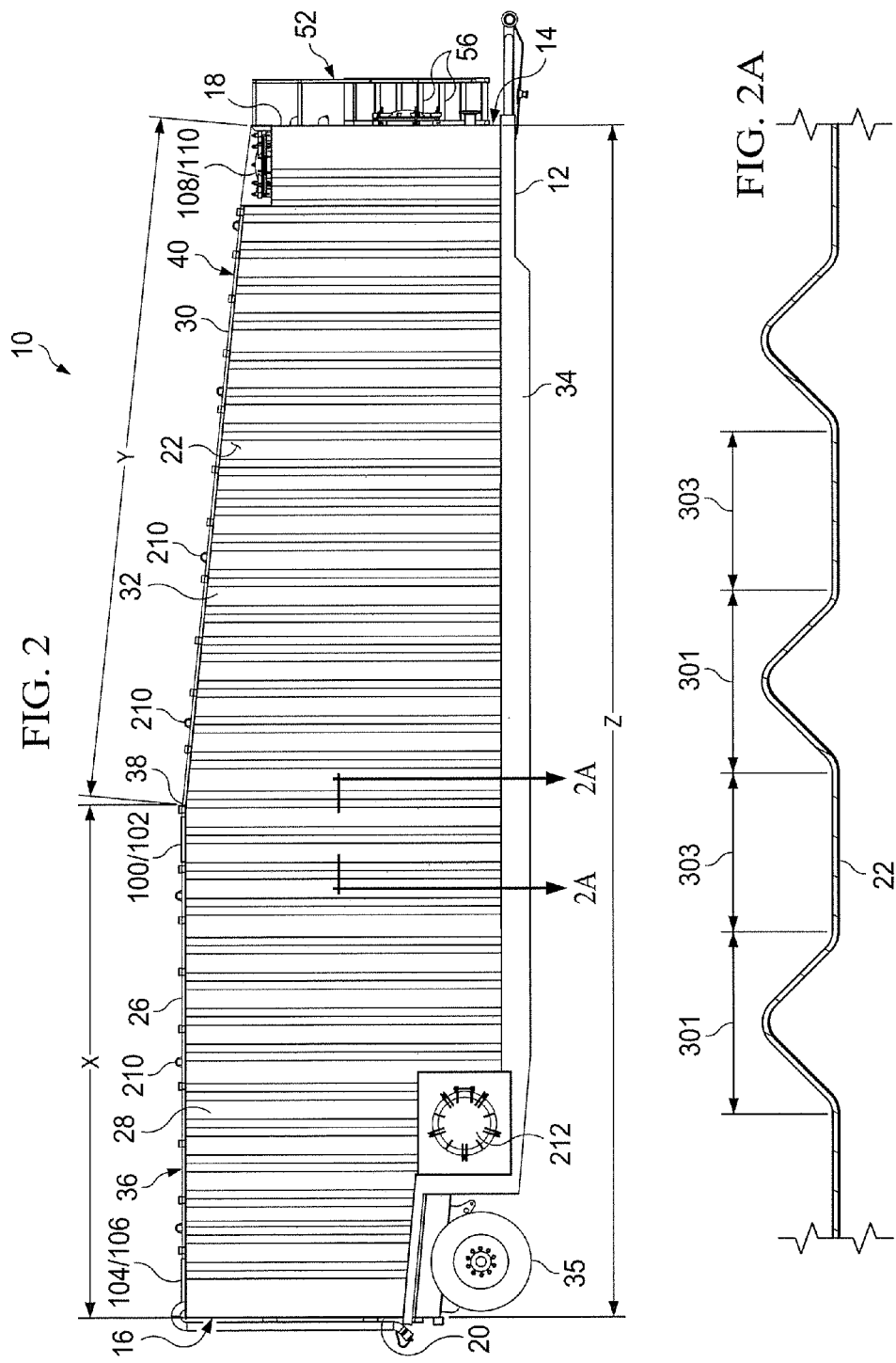
FIG. 2 is a plan view of one side of the storage tank of the subject invention.

The mobile storage tank 10 of the instant invention, as shown in FIGS. 1 and 2, includes a base 12 having a front end 14 and a rear end 16, a substantially vertical front wall 18 attached to the front end 14 of base 12 and a substantially vertical rear wall 20 attached to the rear end 16 of base 12. A pair of substantially parallel vertical side walls 22, 24 are attached to base 12 and both front and rear walls 18, 20. Each side wall 22, 24 has generally the same configuration in that it includes a flat rear portion 36 and then a sloping forward portion 40.

A rear end roof portion 26 extends across the rear portion 36 of side walls 22, 24 defining a rear storage chamber 28 and a front end roof portion 30 which extends across the forward portion 40 defining a front storage chamber 32. The rear and front storage chambers 28, 32 are in fluid communication with each other. Base 12 also includes a plurality of parallel longitudinal skids 34 that allow tank 10 to be moved along the ground when empty. Base 12 includes a wheel base having at least one axle and a plurality of wheels 35 for towing the storage tank 10 by a tractor.

FIG. 2A is partial cross-sectional view taken along line 2A-2A of FIG. 2 which illustrates the "V"-shaped corrugation of front and rear walls 18, 20 and side walls 22, 24. Referring to FIG. 2A, each such wall panel includes a V panel 301 and a straight panel 303. The V panels 301 are staggered between straight panels 303. The edges of each overlap slightly and are welded together. In this manner, maximum structural rigidity is provided to support the heavy lateral loads of the drilling fluids stored within tank 10 yet maximizing the volume. Straight panel 303 is selected to be positioned at the maximum non-permitted road width and the V panel 301 then extends inwardly from that maximum non-permitted width. While the V panel 301 occupies volume, this added rigidity minimizes the loss of volume over other traditional designs.

Figure 3:
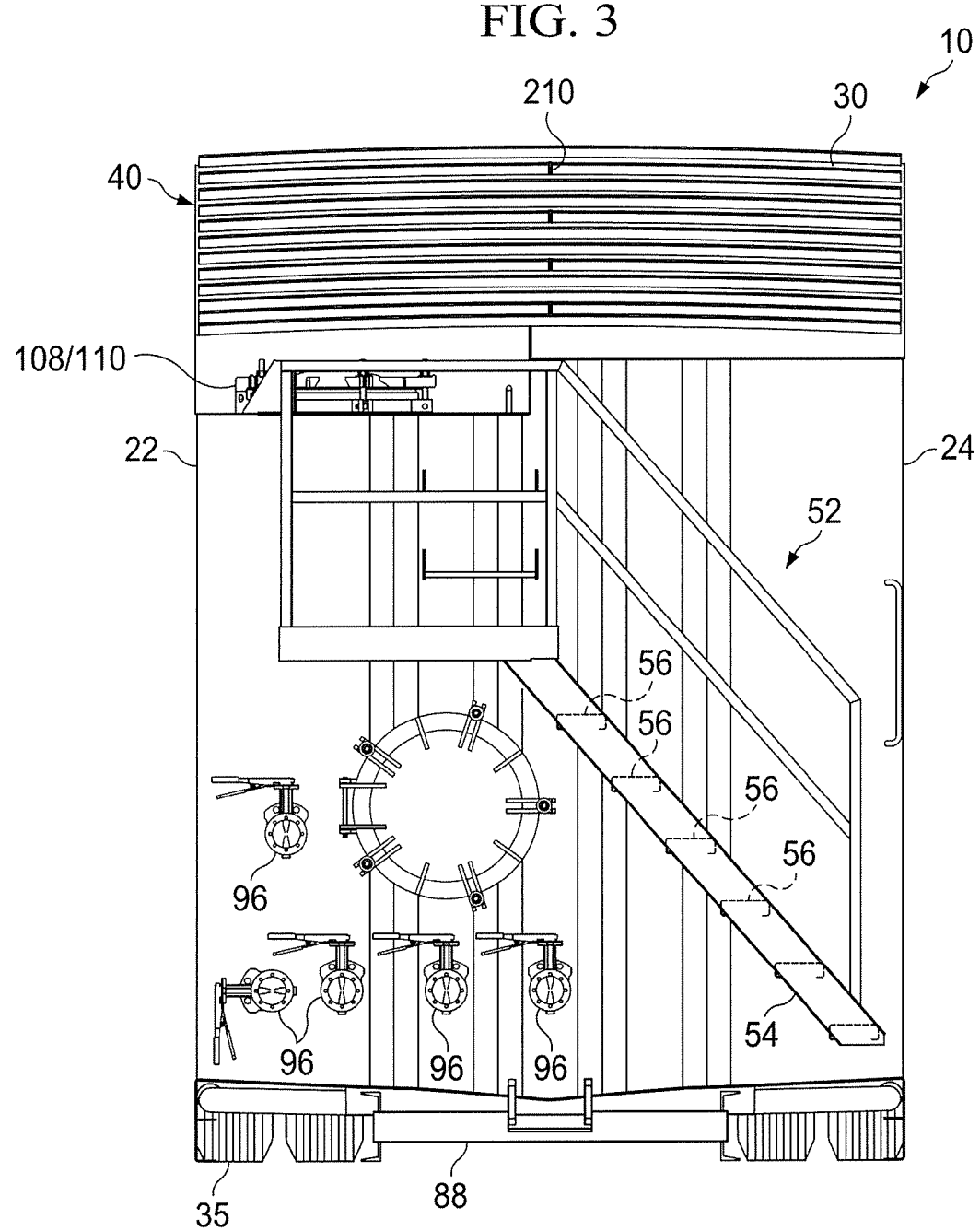
FIG. 3 is a plan view of the front end of the storage tank of the subject invention.

As best shown in FIGS. 1-3, the front and rear end roof portions 26, 30 together define two different portions: the substantially horizontally rear portion 36 and the sloped forward portion 40. The sloped portion 40 extends gradually downward from rear portion 36 to the front end 14 of tank 10. The rear and front end roof portions 26, 30 intersect at line 38.

Figure 4:
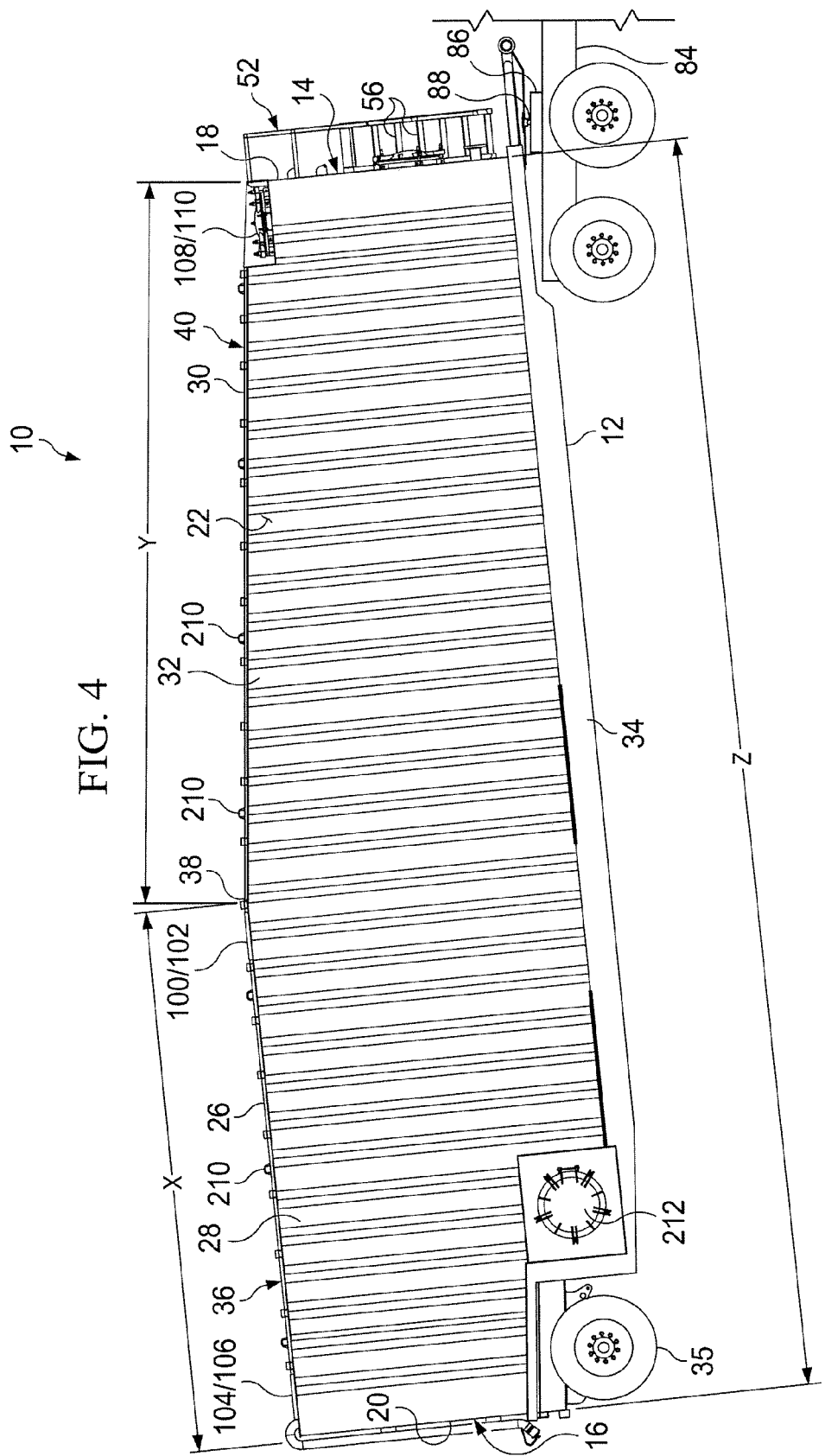
FIG. 4 is a schematic illustration of the storage tank of the subject invention connected to a portion of a tractor vehicle for the purpose of over-the-road transport.

Referring to FIG. 4, a key limitation associated with the transport of tank 10 by a tractor is the maximum non-permitted height of front end 14 above the ground surface. Typically, the maximum non-permitted height in the U.S. is between about 13.5 feet and 14 feet. With a typical tractor height of approximately 48 to 50 inches, this leaves about 114-120 inches for the height of front end 14.

As apparent from FIG. 2, the location of the intersection 38 between the front and rear end roof portions 26, 30 is critical to ensure that the maximum non-permitted height is maintained. However, by the careful selection of the location of intersection line 38, a maximum volume of a particular tank 10 can be achieved. To accomplish such, reference is now made to the distances "X" "Y" and "Z" as shown in FIG. 2. X is the length of the rear end roof portion 26, Y is the length of front end roof portion 30, and Z is the length of side walls 22, 24. In order to achieve the maximum volume for a tank 10 in view of non-permitted maximum width and maximum height, it is preferable that the length X be between about 35% to 60% of length Z, more preferably that length X be between about 40% and 55% of the length Z, and most preferably that length X be between about 42% and 50% of length Z. For a non-permitted maximum road width of 102 inches, non-permitted maximum road height of 13.5 to 14 feet, and a length of side walls 22, 24 being about 503 inches, it is preferable the length of rear end roof portion 26 be between about 176 and 302 inches, more preferable that the length of a rear end roof portion 26 be between about 201 and 276 inches, and most preferably that the length of rear end roof portion 26 be between about 210 and 252 inches.

Referring back to FIGS. 1 and 2, it is also preferable that rear end roof portion 26 have an access port 100 covered by hatch 102 proximate intersection 38. In this manner, when tank 10 is disconnected from the tractor and base 12 portion sits on the ground, port/hatch 100, 102 will be located at the maximum height, thereby permitting tank 10 to be filled to its maximum capacity. Additionally, a rear access port 104 having a hatch 106 may be located proximate rear end 16 and a front hatch access port 108 and hatch 110 may be located proximate front end 14 to supplement in the filling and/or cleaning of the rear and forward storage chambers 28, 32 of tank 10, as necessary.

Referring now to FIGS. 2 and 3, front end 14 of tank 10 may include an inclined stairway assembly 52 which is attached to front wall 18 and extends from the top of front end 14 at front end roof portion 30 adjacent sidewall 22 downwardly to second side wall 24 proximate base 12. As illustrated in FIG. 3, stairwell assembly 52 generally includes a pair of upperly inclined horizontally-spaced parallel risers 54 having a plurality of vertically-spaced horizontal offset or staggered steps 56 extending between the risers in a conventional stairway construction.

Still referring to FIG. 1, the front and rear end roof portions 26, 28 may include a non-skid walkway or surface 200 which extends from the top of inclined stairway assembly 52 to at least port/hatch 100, 102. Such provides a safe walking surface for personnel in the filling and maintenance of tank 10. Additionally, front and rear end roof portions 26, 30 may include anchors 210 to which personnel may attach a harness to protect themselves from falling in the event they slip or fall during the performance of services.

Tank 10 may also include a side hatch or manway 212 that can be employed for gaining access to the rear and forward storage chambers 28, 32 for cleaning purposes or to allow persons to enter tank 10 at this location. A variety of other drains 96 can also be provided as shown in FIG. 3.

Thus, by the location of the intersection line 38, the difference in height between front and rear end roof portions 26, 30 allows tank 10 to be towed via a king-end type 88 to the fifth wheel 86 of a towing vehicle 84 so that the height of tank 10 does not exceed the maximum non-permitted height permitted by law when under tow.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A mobile fluid storage tank comprising:
a base having an front end and a rear end;
a substantially vertical front wall attached to the front end of said base;
a substantially vertical rear wall attached to the rear end of said base;
a pair of substantially parallel vertical side walls attached to said base and to said front and rear walls, said side walls including a first side wall and second side wall, each side wall have a rearward portion and a forward portion;
a rear end roof portion extending across the rearward portion of said side walls substantially parallel with said base and defining a rear storage chamber; and a front end roof portion extending across the forward portion of said side walls and defining a front storage chamber so that the front and rear storage chambers are in fluid communication, said front end roof portion comprising a substantially sloped portion, wherein a length of said rear end roof portion being preferably between about 35% and 60% of a length of said side walls and wherein at least one of said front wall, said rear wall, and said side walls, comprise a plurality of V panel members and straight panel members, said straight panel members placed on the outer extent of the wall with the V panel extending inwardly with respect to the storage tank.

2. The mobile fluid storage tank of claim 1 wherein the length of said rear end roof portion being more preferably between about 40% and 55% of the length of said side walls.

3. The mobile fluid storage tank of claim 2 where the length of said rear end roof portion being most preferably between about 42% and 50% of the length of said side walls.

4. The mobile fluid storage tank of claim 1 further comprising an inclined stairway attached to said front wall and extending from said front end proximate said front end roof portion downwardly to the other side wall proximate said base.

5. The mobile fluid storage tank of claim 1 wherein said rear end roof portion includes an aperture proximate an intersection of said rear end roof portion and said front end roof portion.

6. A mobile fluid storage tank comprising:
a base having an front end and a rear end;
a substantially vertical front wall attached to the front end of said base;
a substantially vertical rear wall attached to the rear end of said base;
a pair of substantially parallel vertical side walls attached to said base and to said front and rear walls, said side walls including a first side wall and second side wall, each side wall have a rearward portion and a forward portion;
a rear end roof portion extending across the rearward portion of said side walls substantially parallel with said base and defining a rear storage chamber; and
a front end roof portion extending across the forward portion of said side walls and defining a front storage chamber so that the front and rear storage chambers are in fluid communication, said front end roof portion comprising a substantially sloped portion,
wherein said rear end roof portion includes an aperture proximate an intersection of said rear end roof portion and said front end roof portion providing access to said rear storage chamber and said front storage chamber,
wherein a length of said rear end roof portion being preferably between about 35% and 60% of a length of said side walls, and
wherein at least one of said front wall, said rear wall, and said side walls, comprise a plurality of V panel members and straight panel members, said straight panel members placed on the outer extent of the wall with the V panel extending inwardly with respect to the storage tank.

7. The mobile fluid storage tank of claim 6 wherein the length of said rear end roof portion being more preferably between about 40% and 55% of the length of said side walls.

8. The mobile fluid storage tank of claim 7 wherein the length of said rear end roof portion being most preferably between about 42% and 50% of the length of said side walls.

9. The mobile fluid storage tank of claim 6 further comprising an inclined stairway attached to said front wall and extending from said front end proximate said front end roof portion downwardly to the other side wall proximate said base.

10. A mobile fluid storage tank trailer for towing by a tractor truck and having a front, a rear, and a body structure including side walls, each side wall having a rearward end and a forward end, the trailer comprising:
a rear end roof portion extending across the rearward end of said side walls defining a rear storage chamber; and
a front end roof portion extending across the forward end of said side walls defining a forward storage chamber said front and rear storage chambers being in fluid communication,
wherein said rear end roof portion includes an aperture proximate an intersection of said rear end roof portion and said front end roof portion providing access to said rear storage chamber and said front storage chamber, and
wherein a length of said rear end roof portion being preferably between about 35% and 60% of a length of said side walls, and
wherein said side walls comprise a plurality of V panel members and straight panel members, said straight panel members placed on the outer extent of the wall with the V panel extending inwardly with respect to the storage tank.

11. The trailer according to claim 10 wherein the length of said rear end roof portion being more preferably between about 40% and 55% of the length of said side walls.

12. The trailer according to claim 11 wherein the length of said rear end roof portion being most preferably between about 42% and 50% of the length of said side walls.

13. The trailer according to claim 10 further comprising an inclined stairway attached to the front of said trailer and extending from said front end roof portion downwardly to the opposite side wall proximate the bottom of said body structure.

* * * * *